United States Patent [19]

Tang et al.

[11] Patent Number: 4,866,268

[45] Date of Patent: Sep. 12, 1989

[54] OPTICAL FAST SYNCHRONIZATION SHAFT POSITION AND SPEED SENSOR

[75] Inventors: Dah-Lain Tang, Canton; Marek T. Wlodarczyk, Birmingham, both of Mich.

[73] Assignee: General Motors Corporation, Detroit, Mich.

[21] Appl. No.: 196,646

[22] Filed: May 20, 1988

[51] Int. Cl.$^4$ ............................................... G01D 5/34
[52] U.S. Cl. ......................... 250/231 SE; 250/237 G
[58] Field of Search ..................... 250/231 SE, 237 G; 324/175; 356/375

[56] References Cited

U.S. PATENT DOCUMENTS

| | | | |
|---|---|---|---|
| 3,418,989 | 12/1968 | Silverman | 364/900 |
| 3,719,177 | 3/1973 | Oishi et al. | 123/494 |
| 3,757,755 | 9/1973 | Carner | 123/414 |
| 4,146,001 | 5/1979 | McCarthy et al. | 123/613 |
| 4,263,506 | 4/1981 | Epstein | 250/231 SE |
| 4,451,731 | 5/1984 | Leonard | 250/231 SE |
| 4,604,725 | 8/1986 | Davies et al. | 364/900 |
| 4,668,862 | 5/1987 | Waibel | 250/231 SE |
| 4,678,908 | 7/1987 | La Plante | 250/231 SE |

*Primary Examiner*—David C. Nelms
*Assistant Examiner*—Eric F. Chatmon
*Attorney, Agent, or Firm*—C. R. Meland

[57] ABSTRACT

A fiber optic detector head senses a light reflective or transmissive pattern on an encoder disk rotated by an engine shaft. The pattern results in three different light levels which are translated by a detector into an electrical pulse train having three different voltages. Patterns encoded into the single pulse train are decoded by a microprocessor to provide specific engine cylinder or cylinder pair position information even within the first spark firing period as well as engine speed information.

9 Claims, 3 Drawing Sheets

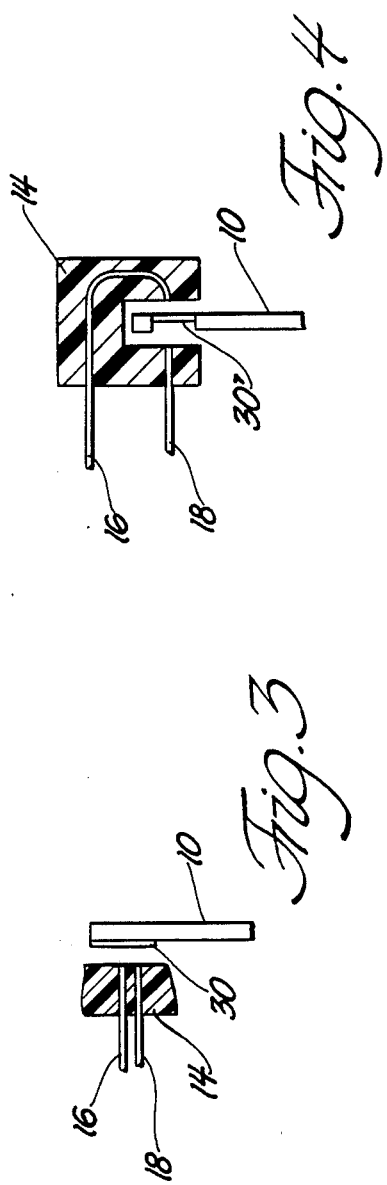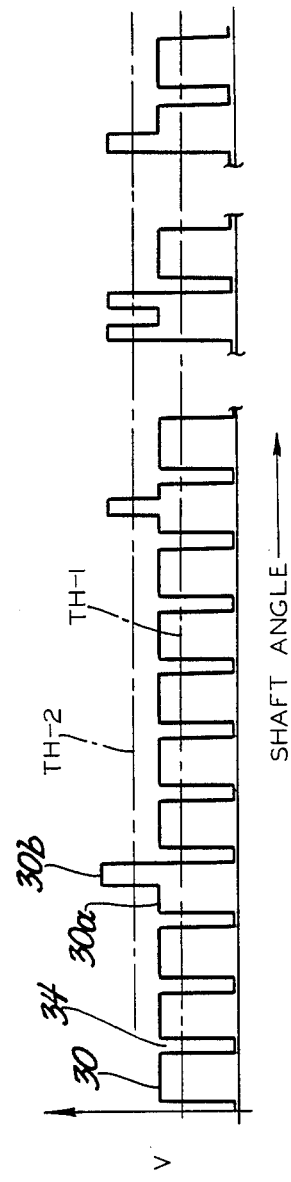

OPTICAL FAST SYNCHRONIZATION SHAFT POSITION AND SPEED SENSOR

FIELD OF THE INVENTION

This invention relates to apparatus for obtaining information on shaft position and particularly to electro-optical apparatus for sensing engine speed and cylinder position.

BACKGROUND OF THE INVENTION

Electronic control of machines frequently requires information about the machine operation to be furnished to the control circuit. The absolute angular position of a rotating shaft and the shaft speed are data which are used in many control methods. In particular, ignition or fuel injection control of internal combustion engines makes use of information about the engine speed, even on an instantaneous basis, and the cylinder position. Then it is possible for the fuel or ignition circuit to apply fuel or ignition voltage to the proper cylinder at the precise time for optimum performance. It is desirable that the information be available, not only during running of the engine, but also upon starting; it is most useful to determine cylinder position information within one firing period. In the case of distributor-less engines this allows the early synchronization of the ignition pulses with the engine position.

It is known to use magnetic pickups with a gear or other toothed wheel to sense the rotation of an engine shaft such as a cam shaft or crank shaft, and to use a special index tooth or a separate pickup to establish the shaft position once each revolution. Similar arrangements using optical pickups with optical encoder disks are also known. Such disks have tracks of black and white patterns or transparent and opaque patterns to furnish binary data. Optical encoder disks with many tracks furnish several bits of digital information which makes accurate postion information possible. This requires many optical detectors, as well, thereby making such a system expensive. Such a device is shown in the U.S. Pat. No. 3,757,755 to Carner which is applied to engine control. A simpler apparatus is shown in U.S. Pat. No. 4,604,725 to Davies et al; a code track and a timing track are used along with two, or preferably four, fiber optic pickups to obtain position information only. Both of these patent disclosures specify binary codes on the encoder disk. This is the usual case since binary codes are easy to read and traditionally are thought to be readily interfaced with digital control circuitry. On the other hand binary codes using "1" and "0" as information bits are limited in the amount of information content.

The need for sufficient information for accurate control purposes has led to complex designs as discusssed above, yet it is generally acknowledged that simple designs are superior, if they accomplish the required function, because they are generally less expensive, more trouble free, and easier to maintain.

SUMMARY OF THE INVENTION

It is therefore an object of the invention to provide an optical and electronic apparatus for sensing engine speed and cylinder position using only a single optical pickup. It is a further object to provide such an apparatus for any shaft speed sensor and position detector.

DESCRIPTION OF THE DRAWINGS

The above and other advantages of the invention will become more apparent from the following description taken in conjunction with the accompanying drawings wherein like references refer to like parts and wherein:

FIG. 3 is a cross section view taken along line 3—3 of FIG. 2 showing a section of the disk and sensing head according to the invention;

FIG. 4 is a cross section view like that of FIG. 3 showing an alternative form of the encoder disk and sensing head;

FIG. 5 is a detector output voltage wave form graph; and

DESCRIPTION OF THE PREFERRED EMBODIMENT

Figure 1:
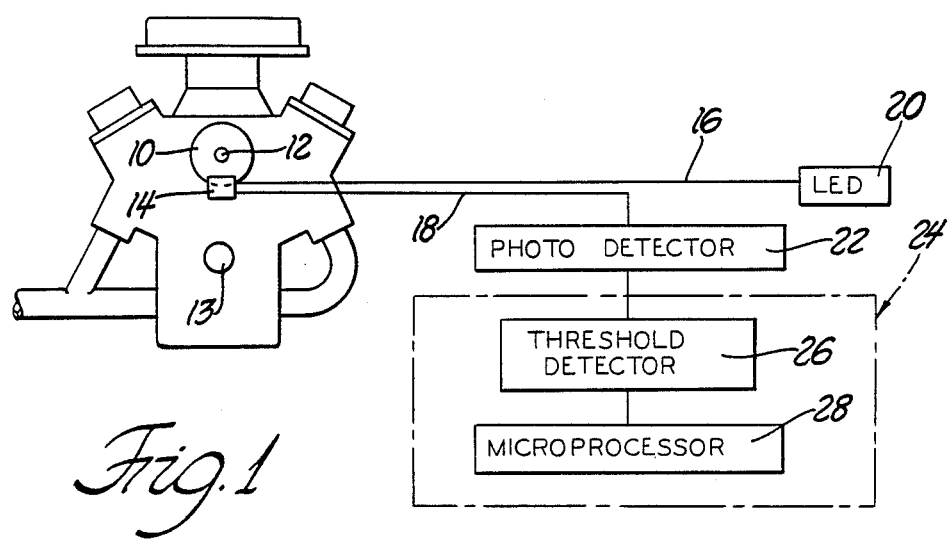
FIG. 1 is a schematic diagram of an engine speed and position detector according to the invention.

FIG. 1 shows a shaft speed and position detector applied to an automotive engine 8 comprising an encoder disk 10 mounted on a cam shaft 12 for rotation with the shaft, an optical sensing head 14 closely spaced from the disk 10, the head 14 comprising a pair of optical fibers 16 and 18 respectively coupled to an LED light source 20 and a photodiode detector 22, and a decoder circuit 24 connected to the output of the detector 22. The LED provides light to the head 14 which illuminates a spot on the encoder disc and light reflected from the spot is picked up by the fiber 18 which transmits the light to the detector 22 where the received light intensity is translated into an output voltage. While the encoder disk 10 is coupled to the cam shaft 12, it can be driven instead by another engine shaft such as the crankshaft 13, or the distributor shaft (not shown). A crankshaft makes two revolutions for each engine cycle so that any single position of the shaft can correspond to either of two cylinders; an encoder on the crankshaft can only designate the position of cylinder pairs, and this is desirable in some types of ignition systems. The detection scheme as described thus far is well known and further detail is not deemed to be necessary except as described below. On the other hand, the particular encoding arrangement is new and provides advantages not heretofore realized in shaft sensor systems.

Figure 2:
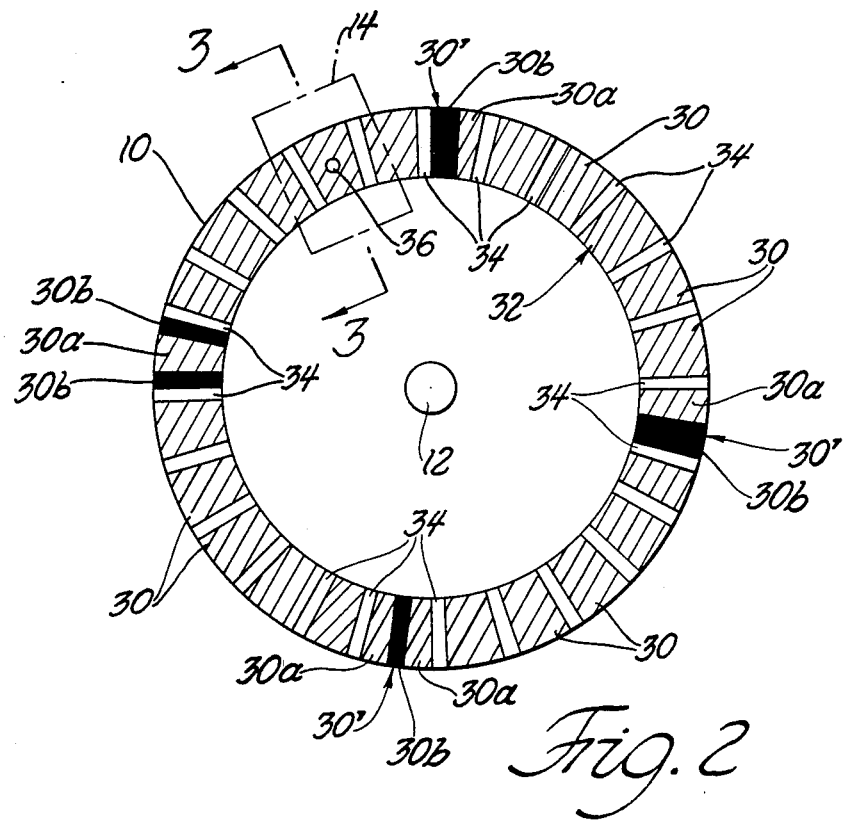
FIG. 2 is a front view of an encoder disk for the apparatus of FIG. 1 showing the encoder pattern according to the invention.

The encoder disk and sensing head are further shown in FIGS. 2 and 3. The face of the encoder disk 10 incorporates a plurality of spaced reflective segments 30 of equal size arranged in a circular track 32 on a nonreflective or absorbing background 34. The track 32 is aligned with the sensor head 14 so that light from the head illuminates a spot 36 on the track 32 and light is reflected to the head 14 in accordance with the reflectivity at the illuminated spot. The segments 30 are equally spaced so that as the shaft and the disk 10 rotate the light reflected from the disk to the sensor head 14 will be in the form of pulses which mark the passage of the segments 30. The pulses then provide information on the rotation of the shaft or its relative position. The time interval between the pulses is an inverse function of the shaft speed. Absolute position information, however, is provided by special characteristics of selected segments 30' at disk angular positions corresponding to given shaft positions.

The special segments 30' have two reflectivity levels 30a and 30b so that the reflected light pulses from such segments 30' vary in amplitude. Each special segment 30' has a unique reflectivity pattern to encode its own signature onto the light pulse. The position of the shaft at the time such an encoded pulse is produced is determined by decoding the pulse pattern. Since the detector 22 output voltage is dependent of the light level an analysis of the voltage variations reveals the shaft position. In an engine application the position of each cylinder is of interest so that for a four cylinder engine the shaft angles represented by the four special segments 30' correspond to the top dead center of each cylinder.

A transmissive encoding scheme as shown in FIG. 4 is an alternative to the reflective arrangement discussed above. Each segment 30 or 30' is a filter so that light is transmitted from the fiber 16 and passes through the segment 30 to the fiber 18 and the light modulation received at the detector is equivalent to the reflective case.

The detector 22 voltage pattern is shown in FIG. 5 which displays voltage versus shaft angle. Each pulse corresponds to a reflective segment and has a voltage which exceeds a first threshold level TH-1. In some cases a voltage wave form exceeds a second higher threshild TH-2. Each pulse is separated from its neighbor by a voltage lower than TH-1. That lower voltage may be zero if the absorbing background of the disk 10 reflects no light. However it is necessary only that the separating voltage be lower than the threshold TH-1 for then it, as well as the other voltage levels, can be recognized by the decoder circuit 24. It will be apparent as the description proceeds that it is essential that at least three voltage levels be provided to encode both the speed and position information on the single pulse train. It is not essential that the zero or low voltage represent the space between the pulses, i.e., the track 32 can use a highly reflective spacer or background and lower or different reflective levels for the segments. The decoder logic can be adjusted to accommodate any such variations on the prinicple. The important consideration is that the special segments 30' yield unique identifiable voltage wave forms and that the speed information be preserved in the code.

Figure 6:
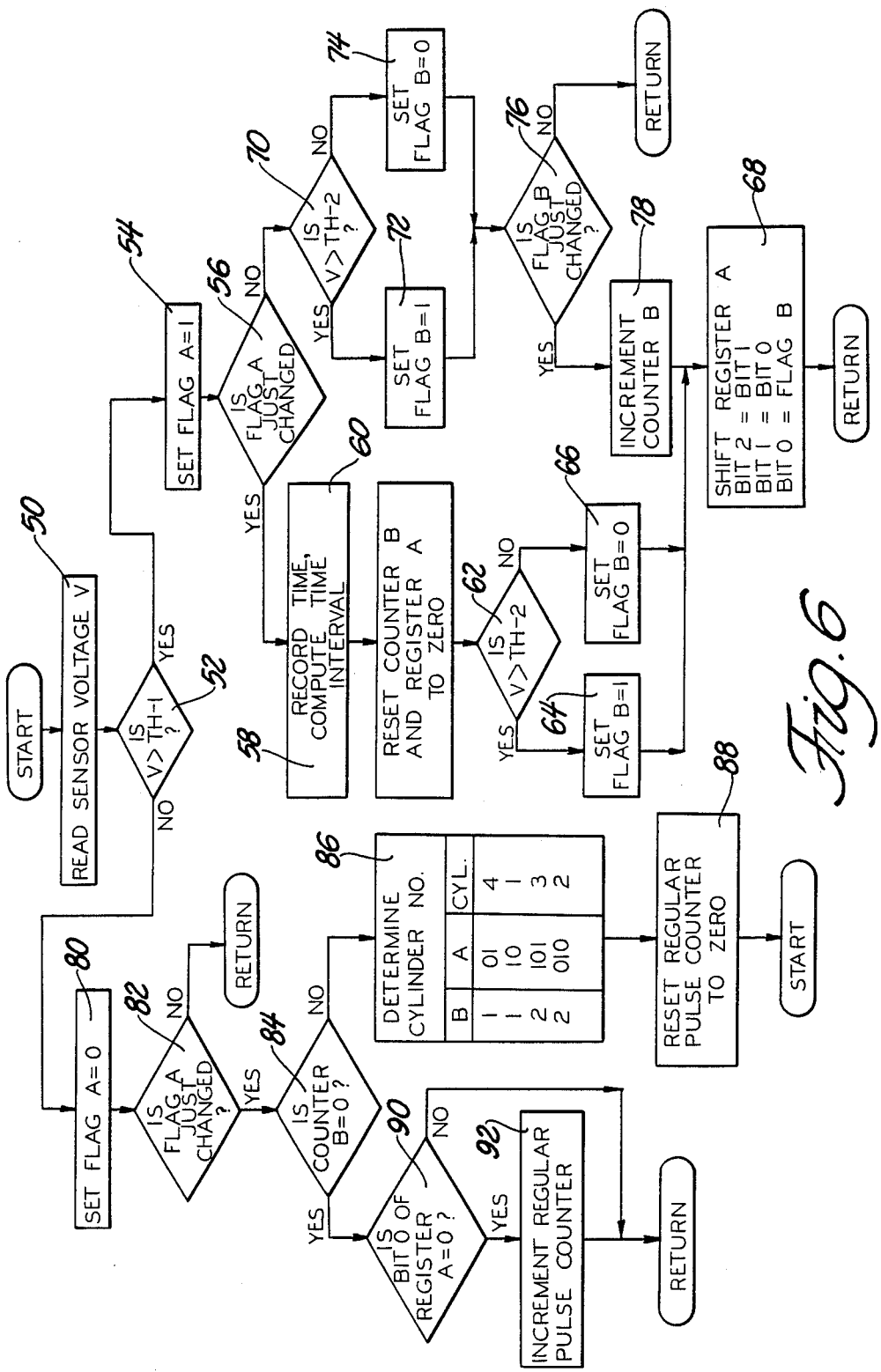
FIG. 6 is a flowchart of the decoding logic used by the detector of FIG. 1.

To decode the voltage pattern the decoder circuit 24 is provided with threshold detectors 26 to detect the voltage levels in the pulse train and a logic circuit in the form of a microprocessor 28 to analyze the pulse shapes and correlate the shapes to shaft positions. Internal memory locations in the microprocessor 28 are designated as counters and a register. The microprocessor is programmed in accordance with the functions of the flow chart of FIG. 6.

The flow chart is described according to the functions shown in each block, the reference numeral in angle brackets referring to the block for the particular function. After START, the sensor voltage is read <50> and is compared to the threshold TH-1 <52>. If the voltage is higher than TH-1 flag A is set to "1" <54>. Then it is determined whether the flag A has just changed <56> indicating that the pulse has just begun. If so, the time of the pulse beginning is recorded and the time interval since the previous pulse is computed to derive shaft speed information <58>. Then the counter B and register A are set to zero <60>. The voltage V is tested against the threshold TH-2 <62> and if it is higher than the threshold the flage B is set to "1" <64>; otherwise the flag B is set to "0" <66>. Then the flag B is shifted into the 0 bit position of the register A <68> and the program returns to START. If the flag A has not just changed <56> the voltage V is compared to the threshold TH-2 <70> and if it is higher the flag B is set to "1" <72>; otherwise the flag B is set to "0" <74>. If the flag B has not just changed the programs returns to START <76> and if it has just changed the counter B is incremented <78>. Then the register A is shifted <68> to shift each bit up one position and to set the bit 0 to the value of flag B. Then the program returns to START and the process is repeated as long as the pulse is present (flag A=1). In this way the register A acquires a bit pattern 01, 10, 101, or 010 and the counter B acquires a value of 1 or 2 which represent the sequence and number of voltage changes during the pulse to reliably identify the shaft position at the beginning of the pulse. At the end of the pulse the voltage drops below TH-1 <52> and the flag A is set to "0" <80>. If the flag A has not just changed <82> the program returns to START; otherwise it is determined whether the counter B is zero <84>. If not, the cylinder number is determined <86> from the truth table and the regular pulse counter is set to zero <88>. If the counter B is zero this is an indication that the pulse was a regular pulse (between TH-1 and TH-2). If the bit 0 of register A is zero <90> the regular pulse counter is incremented and the program returned to START. The regular pulse counter indicates the shaft position with respect to the last identified cylinder position and is used as an accurate timing mark for fuel injection or spark firing.

It will thus be seen that the encoder arrangement and the decoder logic combine to provide a simple and accurate apparatus for determining engine speed and cylinder position. The particular code disclosed here is not the only one which may be devised within the spirit of the invention. For example, a pair of specially coded pulses may be boundary markers for a variable number of intervening regular pulses, that number corresponding to a given cylinder position. In any event, the cylinder position can be identified during the first firing cycle after the start of the engine so that proper fuel and spark application can rapidly be determined. It will be apparent to those skilled in the art that a reflective encoder disk and the sensor head can be replaced by an equivalent transmissive encoder disk and appropriate sensor head to obtain the same results.

The different reflectivity of the respective segments of the disk 10 can be provided by forming the disk 10 of metal and then abrading or roughening respective segment areas to different degrees of roughness. Thus, the most rough segment area would have the least reflectivity. Maximum reflectivity could be provided by not roughening the segment areas that are to have the most reflectivity.

The embodiments of the invention in which an exclusive property or privilege is claimed are defined as follows:

1. Means for monitoring the rotary angular position of a shaft comprising;

optical source means for emitting light, modulator means controlled by the shaft for modulating the light in response to the shaft rotation, the modulator means selectively passing a plurality of light levels as a function of shaft angular position, a single optical detector means receiving the modulated light for generating at least three electrical output levels, said modulator means and detector means being so constructed and arranged that said three electrical output levels define a series of pulses that occur at predetermined shaft angles and where each pulse is comprised of at least two different electrical levels, the sequence of occurrence of said levels of a given pulse being different than the sequence of occurrence of said levels of the next developed pulse, and decoder means responsive to the electrical output levels for determining shaft position.

2. The invention as defined in cliam 1 wherein the sequence of two of the output levels encodes the position information and the third output level provides a background level.

3. The invention as defined in claim 2 wherein the said modulator means is constructed to encode shaft speed information in the modulated light such that the third output level is interrupted by one of the other output levles at a speed dependent rate.

4. Means for monitoring the rotary angular position of a shaft comprising;

a light source, a single light detector for producing electrical signals in accordance with the light amplitude received from the source, a modulator coupled to the shaft for movement therewith for modulating the amplitude of light received by the detector, the modulator having light amplitude modifying means arranged for providing a background level to the detector and sequentially passing pulses of light to the detector, the pulses having at least two amplitude levels that are different from each other and different from the background level, the sequence of occurrence of said two levels for a given pulse being different from the sequence of occurrence of said two levels of the next developed pulse, and decoder means coupled to the detector for determining the angular shaft position from the sequence of pulses.

5. The invention as defined in claim 4 wherein the modifying means is constructed to pass the pulses of at least one of the amplitude levels at a rate dependent only on the shaft rotation speed and the decoder determines the shaft position from the pulses.

6. Means for sensing speed and cylinder position in an automotive engine having an engine shaft with a rotary position corresponding to cylinder position, comprising a light source and a single detector having an electrical output, a light modulating disc optically between the source and the detector and mounted on the engine shaft for rotation therewith, light amplitude modulating means on the disc for passing light to the detector having a reference amplitude and encoding light in pulses having first and second amplitudes that are different from each other and different from the reference amplitude, the modulating means being arranged to provide a series of consecutively occuring pulses corresponding to cylinder postions, each pulse being comprised of said first and second amplitudes, the sequence of occurrence of said amplitudes for a given pulse being different from the sequence of occurrence of said amplitudes of the next developed pulse, and a circuit connected to the detector output for decoding the pulse sequence patterns to reveal cylinder position and engine speed information during engine operation.

7. The invention as defined in claim 6 wherein the reference amplitude is substantially zero.

8. The invention as defined in claim 6 wherein the circuit for decoding the pulse sequence comprises threshold detectors for discriminating the pulses having first and second amplitudes, and logic means responsive to the pulses for determining the cylinder positions.

9. The invention as defined in claim 6 whrerein the light amplitude modulating means is arranged to interrupt the reference amplitude at a rate proportional to the speed of the shaft, and wherein the circuit for decoding the pulse sequence includes means for detecting the time between

* * * * *